(12) United States Patent
Jordan

(10) Patent No.: US 9,580,146 B2
(45) Date of Patent: *Feb. 28, 2017

(54) BICYCLES WITH ELECTRONIC SHIFTING SYSTEMS AND METHODS

(71) Applicant: SRAM, LLC, Chicago, IL (US)

(72) Inventor: Brian Jordan, Chicago, IL (US)

(73) Assignee: SRAM, LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/516,021

(22) Filed: Oct. 16, 2014

(65) Prior Publication Data

US 2015/0033896 A1 Feb. 5, 2015

Related U.S. Application Data

(63) Continuation of application No. 13/228,588, filed on Sep. 9, 2011, now Pat. No. 8,886,417.

(51) Int. Cl.
*B62M 9/132* (2010.01)
*B62M 9/122* (2010.01)
*B62M 25/08* (2006.01)
*B62J 99/00* (2009.01)
*B62K 23/06* (2006.01)
*F16H 59/04* (2006.01)

(52) U.S. Cl.
CPC .............. *B62M 9/132* (2013.01); *B62J 99/00* (2013.01); *B62K 23/06* (2013.01); *B62M 25/08* (2013.01); *F16H 59/044* (2013.01); *B62J 2099/002* (2013.01); *B62J 2099/0013* (2013.01); *Y10T 74/20037* (2015.01)

(58) Field of Classification Search
CPC .... B62M 25/045; B62M 25/08; B62M 25/04; B62M 9/122; B62M 9/132; B62M 9/133
USPC ......... 74/473.13, 473.12; 280/260, 236, 238, 280/261; 200/61.88; 701/51, 52, 53, 58
See application file for complete search history.

(56) References Cited

U.S. PATENT DOCUMENTS

| 4,925,201 | A | | 5/1990 | Leonard |
| 5,447,475 | A | * | 9/1995 | Socard ........................ 474/69 |
| 5,470,277 | A | | 11/1995 | Romano |
| 5,538,477 | A | | 7/1996 | Bellio et al. |
| 5,653,649 | A | | 8/1997 | Watarai |
| 5,728,017 | A | | 3/1998 | Bellio et al. |
| 5,730,030 | A | | 3/1998 | Masui |
| 5,799,539 | A | | 9/1998 | Haase |
| 5,802,923 | A | | 9/1998 | Hara |
| 6,047,230 | A | | 4/2000 | Spencer et al. |
| 6,467,786 | B2 | | 10/2002 | Horiuchi |
| 6,682,087 | B1 | | 1/2004 | Takeda |
| 6,698,307 | B2 | | 3/2004 | Wesling et al. |
| 6,725,143 | B2 | | 4/2004 | Takeda |
| 6,774,771 | B2 | | 8/2004 | Takeda |
| 6,834,876 | B2 | | 12/2004 | Fukuda |
| 6,866,279 | B2 | | 3/2005 | Fujii |
| 6,931,958 | B2 | | 8/2005 | Takeda |

(Continued)

*Primary Examiner* — William Kelleher
*Assistant Examiner* — Gregory Prather
(74) *Attorney, Agent, or Firm* — Milan Milosevic; Lisa Serdynski

(57) ABSTRACT

Electronic shifting systems, mechanisms and methods of using the systems to operate a bicycle that allows front and rear gear changer mechanisms to be controlled with only two switches. The switches can be arranged so that each hand is only required to operate one switch to shift the bicycle.

11 Claims, 11 Drawing Sheets

(56) References Cited

U.S. PATENT DOCUMENTS

| | | |
|---|---|---|
| 6,959,941 B2 | 11/2005 | Takeda |
| 7,007,785 B2 | 3/2006 | Uno et al. |
| 7,373,232 B2 | 5/2008 | Guderzo |
| 7,383,103 B2 | 6/2008 | Guderzo et al. |
| 7,434,489 B1 | 10/2008 | Scranton |
| 7,614,971 B2 | 11/2009 | Fujii et al. |
| 7,630,810 B2 | 12/2009 | Guderzo |
| 7,779,724 B2 | 8/2010 | Fujii |
| 7,854,180 B2 | 12/2010 | Tetsuka |
| 7,900,946 B2 | 3/2011 | Hara et al. |
| RE43,562 E | 7/2012 | Takeda et al. |
| 8,235,408 B2 | 8/2012 | Watarai |
| 8,297,143 B2 | 10/2012 | Fujii et al. |
| 8,360,909 B2 * | 1/2013 | Ichida .............................. 474/70 |
| 8,744,699 B2 | 6/2014 | Yamaguchi et al. |
| 2003/0100392 A1 | 5/2003 | Ichida |
| 2003/0160420 A1 | 8/2003 | Fukuda |
| 2004/0112161 A1 | 6/2004 | Takamoto |
| 2004/0239489 A1 | 12/2004 | Takeda |
| 2005/0029031 A1 | 2/2005 | Thomas |
| 2005/0098978 A1 * | 5/2005 | Kitamura et al. ............ 280/260 |
| 2005/0223840 A1 | 10/2005 | Takamoto |
| 2005/0253356 A1 | 11/2005 | Matsueda et al. |
| 2006/0022425 A1 | 2/2006 | Nishimoto |
| 2006/0058134 A1 | 3/2006 | Mercat |
| 2007/0137361 A1 | 6/2007 | Fujii |
| 2009/0031841 A1 | 2/2009 | Tetsuka |
| 2009/0038427 A1 | 2/2009 | Watarai |
| 2010/0170753 A1 | 7/2010 | Castro |
| 2010/0244401 A1 * | 9/2010 | Hara ...................... B62M 9/122 280/261 |

\* cited by examiner

BICYCLES WITH ELECTRONIC SHIFTING SYSTEMS AND METHODS

BACKGROUND OF THE INVENTION

This present invention relates to bicycles and electronic shifting systems and methods of operating such systems.

Bicycles with prior art electronic shifting systems which use electric motors to shift front and rear gear changers are known in the industry, but suffer from some deficiencies. For example, typically four buttons are employed in prior art systems to operate front and rear gear changers. These systems have a front gear changer upshift button, a front gear changer downshift button, a rear gear changer upshift button, and a rear gear changer downshift button. This arrangement requires each hand to operate two buttons, typically with the right hand controlling the rear gear changer buttons and the left hand controlling the front gear changer buttons. A disadvantage of this kind of system is that it is easy for riders to accidentally press the wrong button when they are focusing on the road ahead.

There is a demand, therefore, to provide a bicycle with a shifting system that is effective and reduces or avoids unintended and/or mis-shifts. The invention satisfies the demand.

SUMMARY OF THE INVENTION

The invention is directed to electronic shifting systems, mechanisms and methods of using the systems that allow both front and rear gear changer mechanisms to be controlled with only two switches. The switches can be arranged so that each hand is only required to operate one switch to shift the bicycle. This eliminates the risk of accidentally actuating the wrong switch and simplifies shifting. For purposes of the invention, and unless specified otherwise, the term "switch" or "switch mechanism" will be understood to mean a single device, for example a button with an associated set of contacts or a toggle with an associated set of contacts, the actuation of which (opening or closing) causes a continuous or a momentary change of state, preferably in an electric circuit, and not referring to a housing or the like containing a plurality of such devices. Actuation refers to the act of causing the change of state of the switch and thus the system such that a signal is generated.

The invention generally includes a pair of handlebar mounted switches used to control a bicycle electronic shifting system. In one embodiment, a first switch may be configured to shift a rear gear changer in an upshift direction and a second switch may be configured to shift the rear gear changer in a downshift direction. No greater than two switches are required for the system to produce all of the necessary signals and actions for controlling a bicycle with front and rear gear changers. For purposes of this application, downshift will be understood to mean the act of changing to a sprocket and producing less gear inches or, in other words using a rear gear shift scenario, shifting from a first sprocket to a second sprocket, wherein the second sprocket has a larger diameter than the first sprocket.

When both switches are operated at the same time or concurrently (overlapping in duration), a front gear changer is shifted from a current chainring to the other chainring of a two chainring system, for example. In other words, if the switches are normally in an open state, if both switches are caused to be in a closed or an actuated state concurrently, the front gear changer is caused to perform a shift operation.

The switches can be mounted to opposite sides of the handlebar so that one switch can be operated with the left hand and the other operated with the right hand. The switches can be mounted to the bar ends of a time-trial bicycle, inboard of the hand grips on a flat bar bicycle, or in a brake support structure typically used on drop-bar road bikes, for example. Other suitable locations are contemplated by the invention including the possibility of mounting two switches on the same part or adjacent parts of the bicycle structure.

Another advantage of the invention is that possibility of accidentally shifting the front gear changer, a large gear change that could cause a crash if it happens unexpectedly, is greatly reduced because two switches must be actuated concurrently.

One aspect of the invention provides an electronic shifting system for a bicycle including a first switch mechanism and a second switch mechanism. A control unit is in communication with and responsive to signals from the first and second switch mechanisms. A front gear shift mechanism is in communication with and responsive to command signals from the control unit, wherein the control unit is configured to determine when both the first switch mechanism and the second switch mechanism are actuated concurrently and responsively sends a front shift command signal to the front gear shift mechanism to perform a front gear shift operation.

Another aspect of the invention provides an electronic gear shifting system for a bicycle including a first switch mechanism and a second switch mechanism. A control unit is in communication with and responsive to signals from the first and second switch mechanisms. A rear gear shift mechanism is in communication with and responsive to command signals from the control unit. Actuating the first switch mechanism sends a first signal to the control unit which is configured, in response to the first signal, to send a first command signal to the rear gear shift mechanism to perform an upshift. Actuating the second switch mechanism sends a second signal to the control unit which is configured, in response to the second signal, to send a second command signal to the rear gear shift mechanism to perform a downshift. A front gear shift mechanism is in communication with and responsive to the command signals from the control unit, wherein the control unit is configured to determine when both the first switch mechanism and the second switch mechanism are actuated concurrently and responsively sends a front shift command signal to the front gear shift mechanism to perform a front gear shift operation.

Yet another embodiment of the invention provides a method of shifting a bicycle with an electronic gear shifting system, wherein the electronic gear shifting system includes a first switch mechanism, a second switch mechanism, a control unit in communication with and responsive to signals from the first and second switch mechanisms, a front gear shift mechanism and a rear gear shift mechanism, the front and rear gear shift mechanisms in communication with and responsive to command signals from the control unit, including the steps of actuating the first switch mechanism to perform an upshift with the rear gear shift mechanism, actuating the second switch mechanism to perform a downshift with the rear gear shift mechanism, and actuating both the first and second switch mechanisms concurrently to cause the front gear shift mechanism to perform a front gear shift operation.

Yet another aspect of the invention provides a method of shifting a bicycle with an electronic gear shifting system, wherein the electronic gear shifting system includes a first switch mechanism, a second switch mechanism, a control unit in communication with and responsive to signals from the first and second switch mechanisms, and a front gear shift mechanism in communication with and responsive to command signals from the control unit, comprising the steps of determining with the control unit that both of the first and second switch mechanisms are actuated concurrently, and performing a front gear shift operation with the front gear shift mechanism.

It will be understood that the various signals from the switches and generated by the control unit(s) and so on, may take various forms. For example, signals from the switches may be individual or discreet or somehow modified in certain circumstances, such as when both switches are actuated concurrently (caused to be both in a changed state at the same time or overlapping in duration). The signals may be the change of state of a circuit, or some other indication that the switch or circuit or circuitry has changed state such that the control unit can detect the change of state and determine if and/or when some responsive action may be generated.

These and other features and advantages of the invention will be more fully understood from the following description of one or more embodiments of the invention, taken together with the accompanying drawings.

DETAILED DESCRIPTION OF THE PREFERRED EMBODIMENTS

Preferred embodiments of the invention will herein be described with reference to the drawings. It will be understood that the drawings and descriptions set out herein are provided for illustration only and do not limit the invention as defined by the claims appended hereto and any and all their equivalents.

Figure 1:
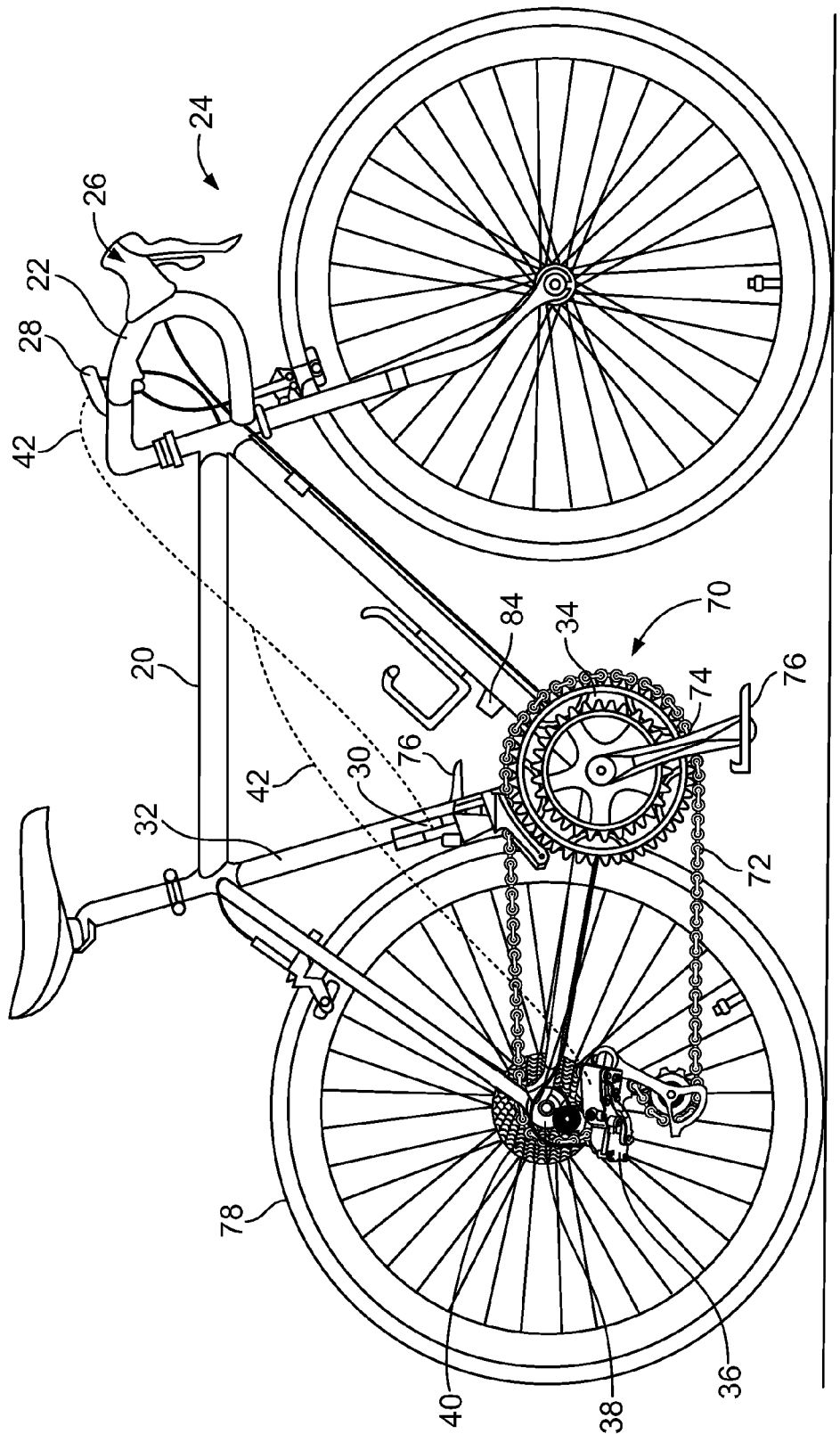
FIG. 1 shows a bicycle with drop-style handlebars incorporating an embodiment of the invention.

Referring to FIG. 1, the invention is shown adapted to a bicycle 20 with drop-style handlebars 22, like that for a road or a cyclocross style bike or the like. It will be understood that any suitable mounting arrangement of the system components is contemplated by the invention, the controls for which are preferably on the handlebar or on a handlebar associated structure as depicted, or anywhere they can be accessed by a user. The shifting system 24, according to an embodiment of the invention, may include a pair of shift units 26, mounted to the handlebars 22. A control unit 28 is also shown mounted to the handlebars 22. A front gear changer or front gear shift mechanism 30 may be positioned on the seat tube 32 adjacent the front sprockets 34 so as to effect gear changes to the front sprockets or an associated structure. A rear gear changer or rear gear shift mechanism 36 is mounted to a frame member 38 of the bicycle, such as a mount or rear dropout or an associated structure as is known, in a position to effect gear changes to a rear sprocket 40. A communication link 42 is provided between the control unit 28 and the shift units 26, the front gear changer 30, and the rear gear changer 36. The system may also be applied, in some embodiments, to a bicycle where only a front or only a rear gear changer is used.

The control unit 28 is shown mounted to the handlebar 22, but could be located anywhere on the bicycle 20 or, in the alternate, distributed among the various components with routing of the communication link 42 to accommodate the necessary signal and power paths. It would also be possible to locate the control unit 28 other than on the bicycle, for example on the user's wrist or in a jersey pocket, for example. The communication link 42 could include wires or be wireless, or be a combination thereof.

Figure 2:
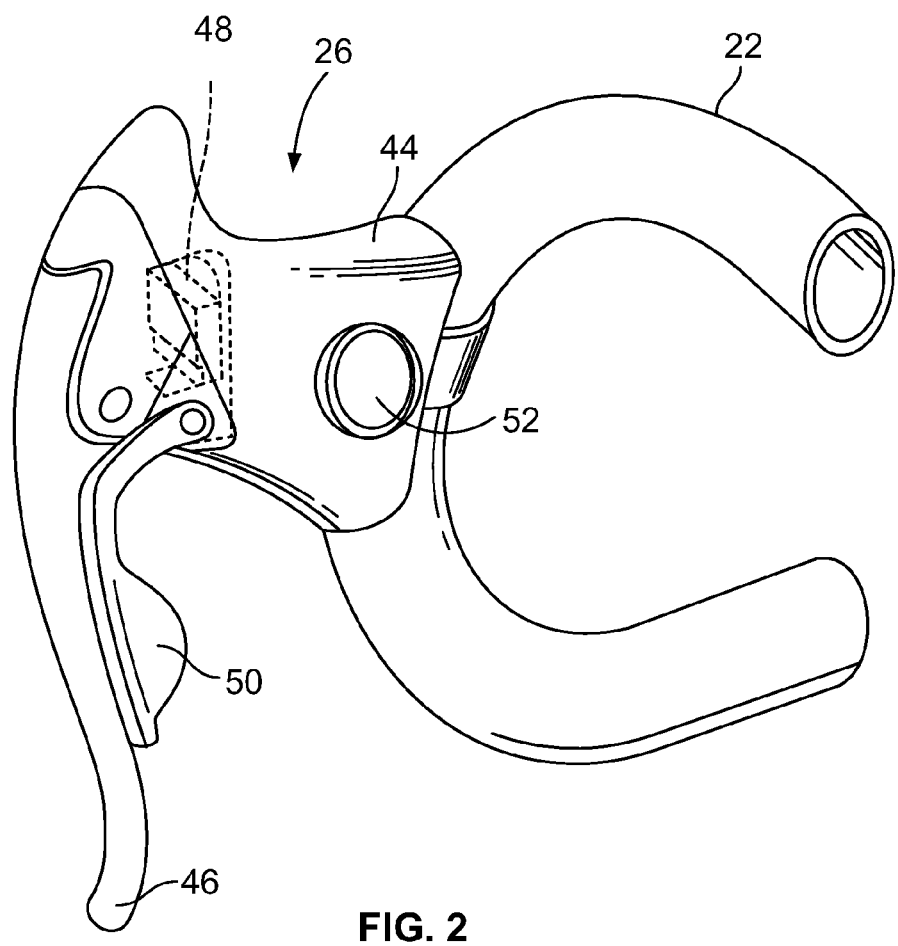
FIG. 2 shows a shift unit according to an embodiment of the invention.

One of the shift units 26 is shown in more detail in FIG. 2. It will be understood that a bicycle will preferably be provided with a pair of shift units, or a number in an amount and positioned as desired. For example, a time trial bicycle may be provided with shift units on the brake lever housings and another pair of modified shift units may be adapted to the time trial bar extensions. The shift unit 26 may include a brake support 44 mounted to the handlebar 22 and a brake lever 46 pivotally mounted to the brake support. A switch mechanism 48 is mounted to the shift unit 26, and preferably in or on the brake support 44 and may pivotally support a shift lever 50. The lever 50 may be permitted to rotate inward in response to actuation of the brake lever 46 without operating the switch mechanism 48. The switch mechanism 48 preferably includes a normally open contact switch (not shown) configured such that the switch closes or is actuated when the shift lever 50 is moved in an inward direction toward the center plane or center line (not shown) of the bicycle 20. Alternatively, a shift button 52 could be employed on the brake support 44 or some other location on the shift unit 22 to actuate the switch mechanism 48.

The invention is not limited to the depicted placement or configuration of the switch mechanism 48; a signal can be generated by a button 52 located on the brake support 44, brake lever 46, or handlebar 22, for example, or by a shift lever pivotally connected to the brake support 44, brake lever 46, or handlebar 22, for example. Other actuating mechanisms may be employed to generate a signal to the control unit 28. The switch mechanism 48 could also be configured to be operated by pressing the brake lever 46 inward toward the center plane of the bicycle 20, for example.

In the alternate, while the invention contemplates operating the switches to generate signals by closing the switch, e.g., closing an electrical circuit, the invention also could be operated by actuating, operating or causing a switch to open, e.g., causing an open circuit or changing the state of the mechanism and thus, the associated circuit. Furthermore, the switches could be optical or other types of switches, for example. The function of the switches are generally to permit the user/operator to cause a change of state of the switch, and thus potentially of the system, and generate a signal which the control unit uses to detect and interpret an action of the user and generate an appropriate response or initiate an appropriate next step or number of steps.

Returning to FIG. 1, the drive unit 70 comprises a chain 72, front sprocket assembly 34, which is coaxially mounted with a crank 74 having pedals 76, and an electrically controlled front gear changer or gear change mechanism 30, a rear sprocket assembly 40 coaxially mounted with the rear wheel 78, and an electrically controlled rear gear changer or gear change mechanism 36.

Figure 3:
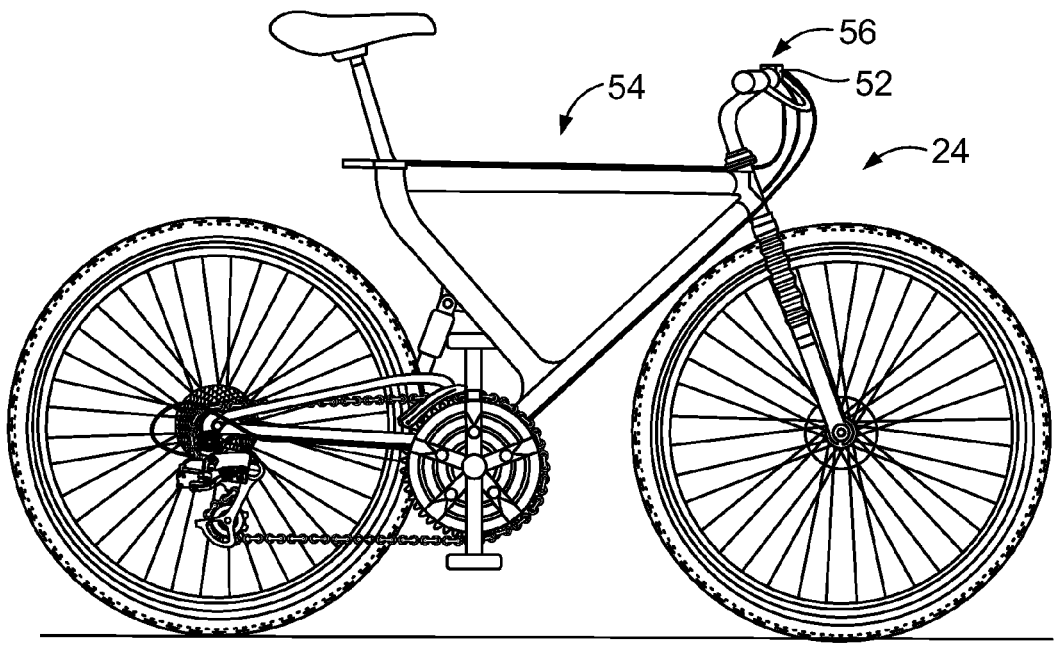
FIGS. 3 and 4 show the invention adapted to be used on a flat handlebar, like that usable on a mountain bike.
Figure 4:
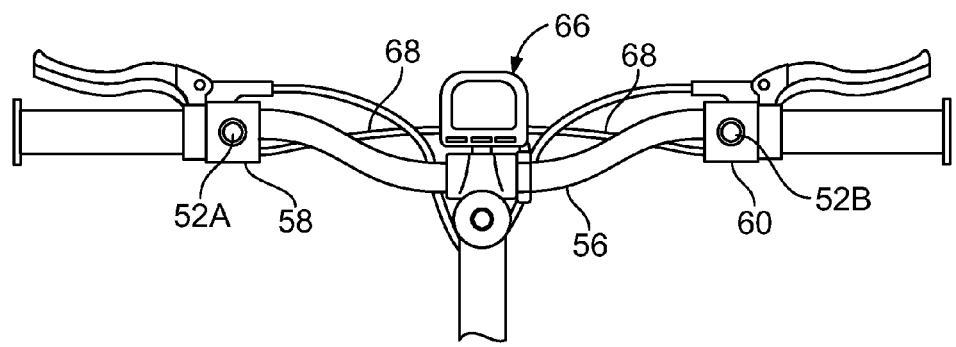

The invention is shown on a mountain or comfort or urban style bicycle 54 with flat style bars 56 in FIG. 3. It will be understood that the system 24 will be similar to that of the above described system with adaptations to the particular style of bicycle and its components. A top view of the mountain bicycle handlebar 56 is shown in FIG. 4. A left shift unit 58 and right shift unit 60 are mounted to the handlebar 56. Each shift unit 58, 60 contains a button 52 that operates a switch (not shown) mounted to or within a respective shift unit.

The switch units 58, 60, control unit 28, front gear changer 62, and the rear gear changer 64 are connected by a communication link 68. The communication link 68 could be wired (as in the present example) or wireless, or a combination of each. The buttons 52 can be configured so that the right button 52b is actuated by the right hand, and the left button 52a is actuated by the left hand. The switches of each button 52a, 52b can be configured to be normally open or normally closed. The switches in this example are preferably configured to be normally open, and will close momentarily when acted upon. It will be understood that the examples given herein are for the purpose of disclosing an embodiment of the invention without the intention of introducing limitations that narrow the scope thereof.

Figure 5:
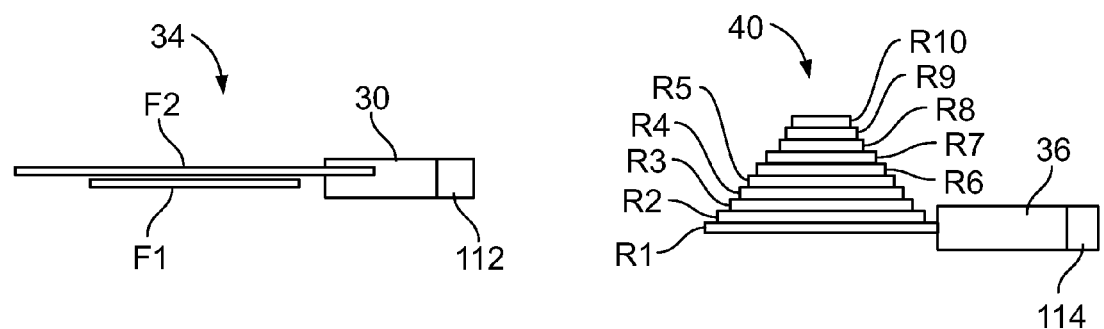
FIG. 5 shows a diagram of front and rear gear changers and front and rear sprockets.

Turning to FIG. 5 (and also referring to FIG. 1) the front sprocket assembly 34 may include two coaxially mounted chain rings, gears or sprockets F1-F2, and rear sprocket assembly 40 may include ten gears, cogs or sprockets R1-R10. The number of teeth on front sprocket F1 is preferably less than the number of teeth on sprocket F2. The numbers of teeth on rear sprockets R1-R10 typically gradually decrease from rear sprocket R1 to sprocket R10. Front gear changer 30 moves from a first operating position to a second operating position to move the chain 72 between sprockets F1 and F2, and the rear gear changer 36 moves between ten operating positions to switch the chain to one of rear sprockets R1-R10. Preferably, a front gear position sensor 112 is used to sense the operating position of the front gear changer 30, and a rear gear position sensor 114 is used to sense the operating position of the rear gear changer 36. Gear position sensors 112, 114 may comprise rotary encoders, potentiometers, or other devices capable of sensing position in a gear changer mechanism. Preferably, a battery 84 (FIG. 1), or more than one battery, or some other power source powers the front and rear gear changers 30, 36 as well as other electric components within the system.

The control unit 28 comprises a microprocessor that is programmed to receive signals from the shifting system and responsively generate signals to effect gear changes. One example of such a control unit 28 is shown diagrammatically at FIG. 6a, which will be described in the context of the example shown in FIGS. 1 and 2, and includes a controller, including a gear shift controller 100, a switch interpreter 102, and a memory 141 to store a program (computer executable code) and operational variables. The hardware that stores the program and performs computer operations based on the instructions in the memory and signals being generated by the various electronic components, such as the position sensors and the switches includes a microcontroller or programmable logic device (PLD) or a similar component capable of performing the functions described herein.

The switch interpreter 102 monitors the switches in right and left shift units 27a, 27b and sends an appropriate command to the gear shift controller 100 responsive to the request or input signal from the switch mechanism 48 of each of the units 27a, 27b. The front and rear gear changer 30, 36 each comprises a motor 104, 106 that may include gear reduction (not shown), a motor driver 108, 110 for driving the motor, and a position sensor 112, 114 that senses the operating position of the respective gear changers. The gear shift controller 100 then generates a command signal to move the appropriate gear changer 30, 36 to the requested operating position or gear in response to signals received from the shift interpreter 102 and the position sensor 112, 114.

In one illustrative example, the operation of the invention is as follows. When the right switch 27a is pressed, the rear gear changer 36 performs an upshift, when the left switch 27b is pressed the rear gear changer 36 performs a downshift. When both right and left switches 27a, 27b are pressed concurrently, the front gear changer 30 is shifted or toggled between the two front sprockets 34, i.e. from one of to the other of the front sprockets.

Figure 6A:
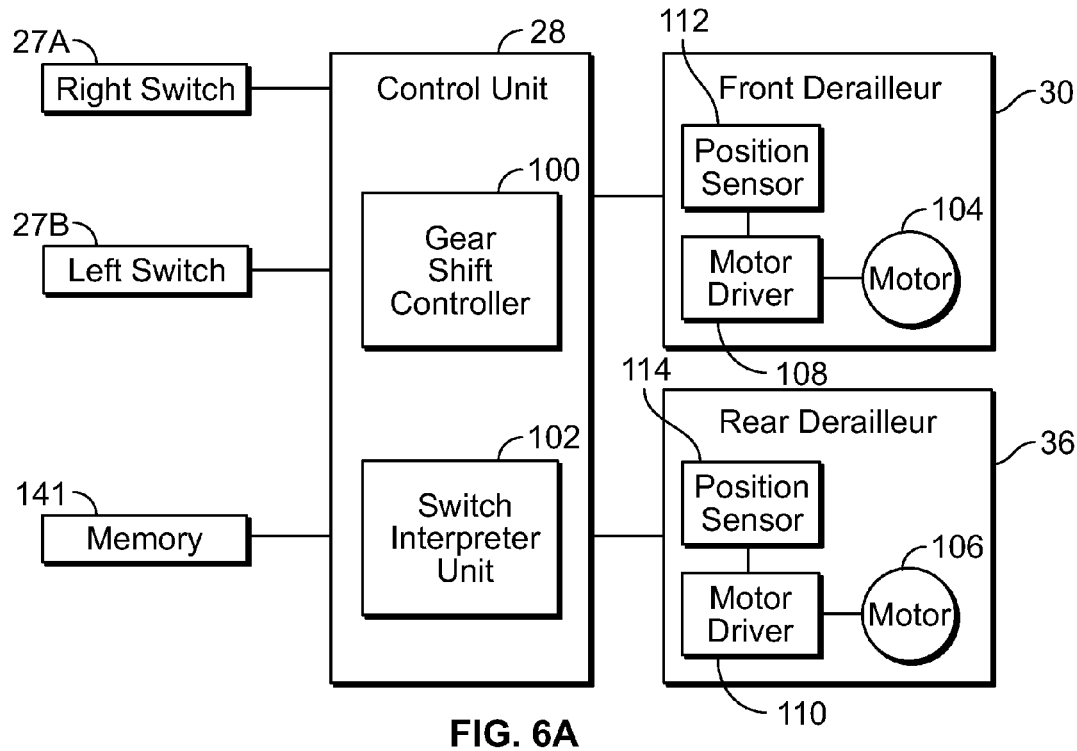
FIG. 6a shows one embodiment of a gear change control unit according to an embodiment of the invention.
Figure 6B:
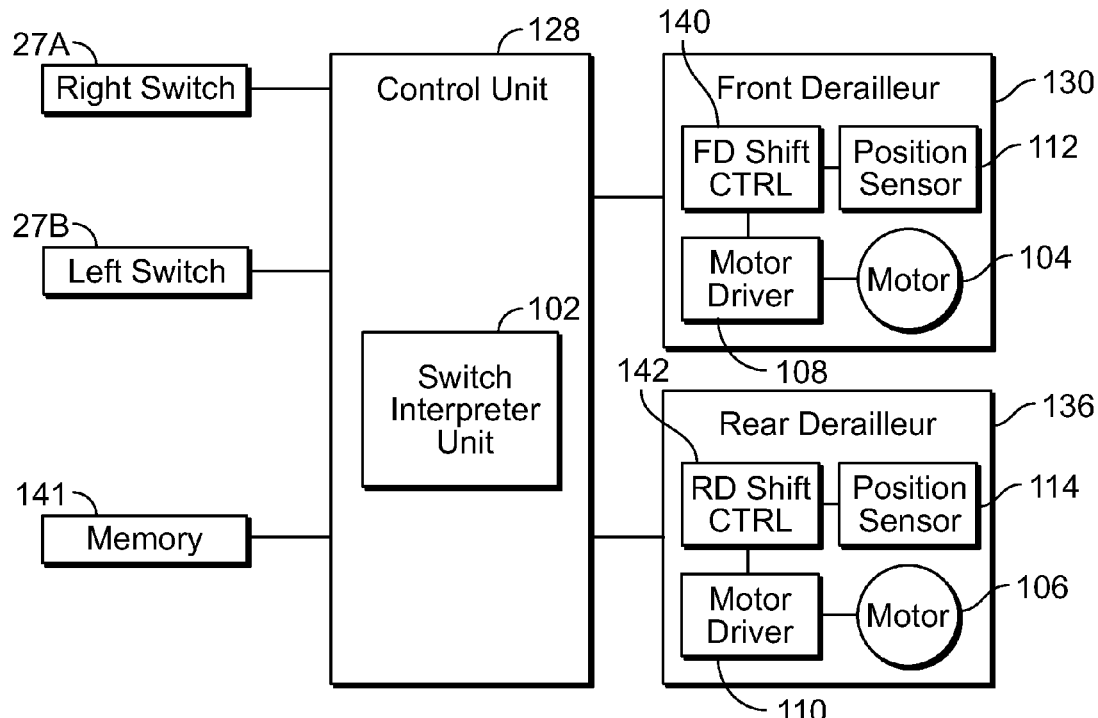
FIG. 6b shows an alternate embodiment of a gear change control unit.

Alternatively, the gear shift controller 100 in FIG. 6a could be replaced with a front shift controller 140 that includes a microprocessor located in or associated with the front gear changer 130 and a rear shift controller 142 that includes a microprocessor located in or associated with the rear gear changer 136 as shown in FIG. 6b. In this embodiment the switch interpreter unit 102 would send gear shift signals to both the front shift controller 140 and rear shift controller 142 when requested. The control system shown in FIG. 6b could otherwise have the same elements as that shown in FIG. 6a.

Figure 7:
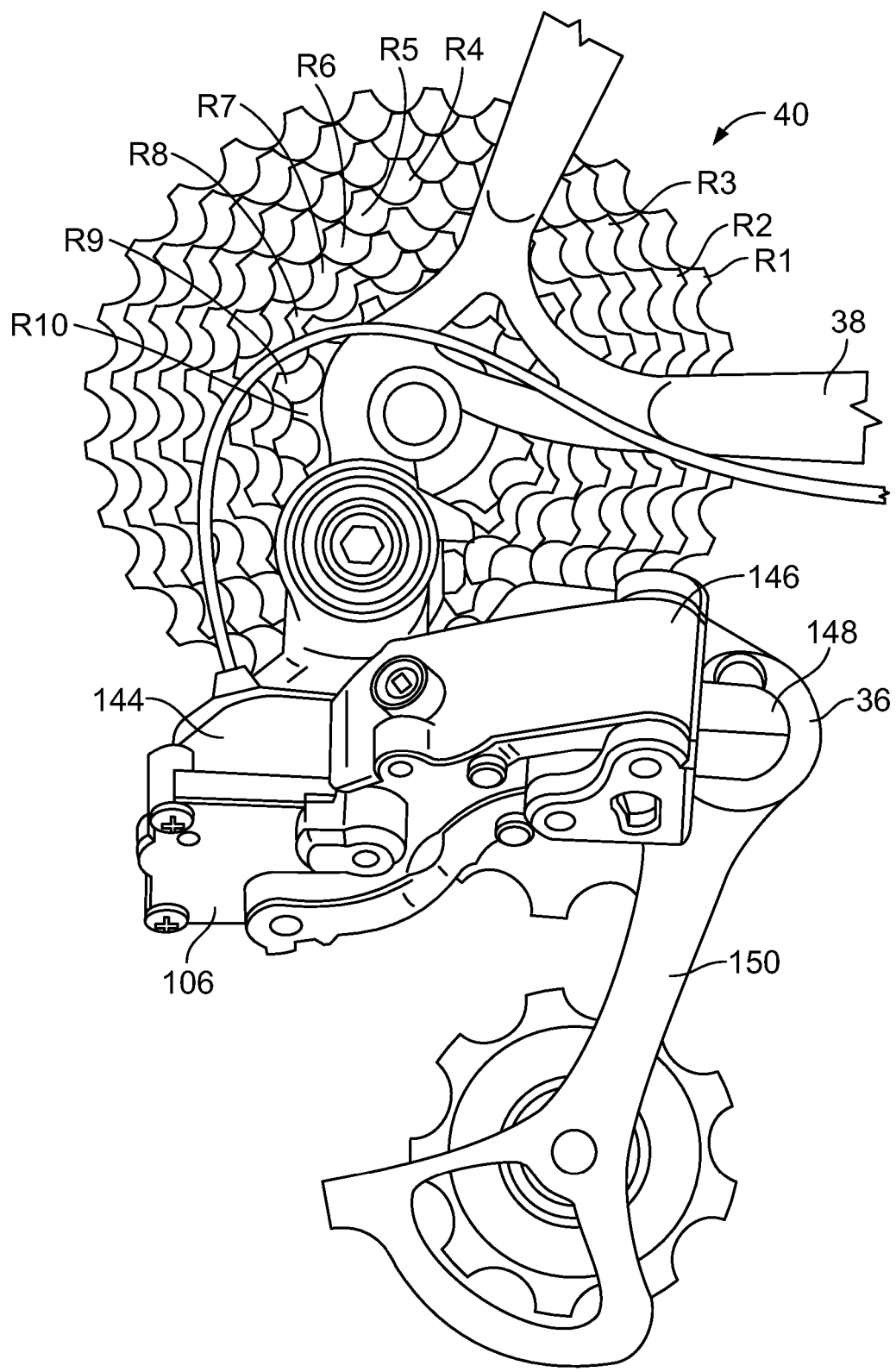
FIG. 7 shows a rear gear change mechanism according to an aspect of the invention.

As shown in FIG. 7, the rear gear changer 36 preferably includes a base member 144 mounted to the bicycle frame 38 that houses a gear shift motor and gear mechanism 106, a link mechanism 146 pivotably connected to the base member, and a movable member 148 pivotably mounted to the link mechanism so that the movable member moves laterally relative to the base member in accordance with the operation of the motor housed within the base member. Movable member 148 pivotably supports a chain guide 150 so that lateral movement of the movable member switches the chain 72 among rear sprockets 40 (R1-R10).

Figure 8:
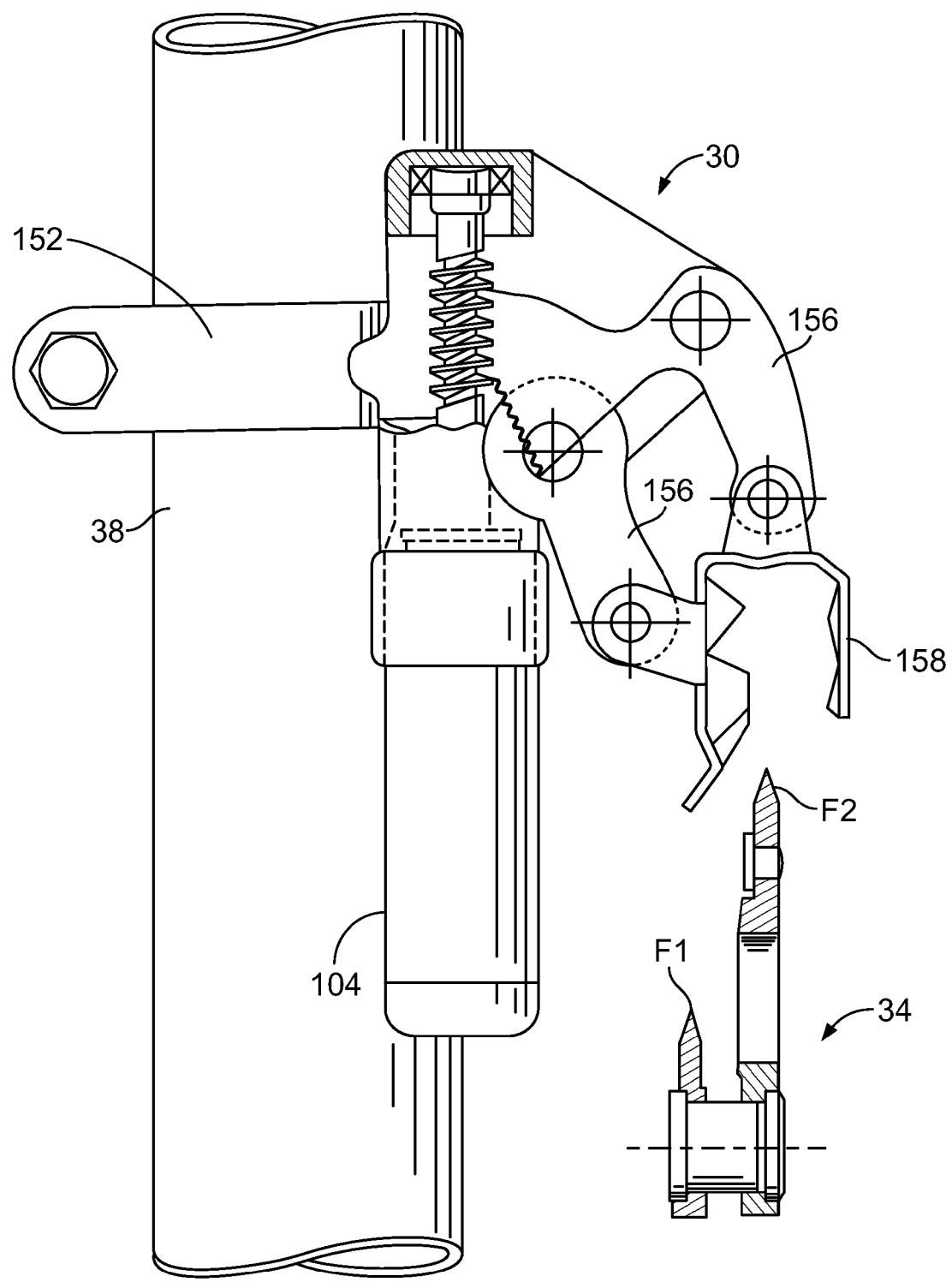
FIG. 8 shows a front gear change mechanism according to an aspect of the invention.

As shown in FIG. 8, the front gear changer 30 preferably includes a base member 152 mounted to the seat tube frame member 32 of a bicycle that houses a front gear shift motor 104, an output gear 154 coupled to the gear shift motor, a link mechanism 156 pivotably connected to the base member and coupled to the output gear, and a movable chain guide member 158 pivotably mounted to the link mechanism. Thereby, the movable chain guide member 158 moves laterally relative to the base member 152 in accordance with the operation of the motor 104 associated with the base member so that lateral movement of movable chain guide member 158 switches the chain 72 among front sprockets 34 (F1-F2).

Figure 9:
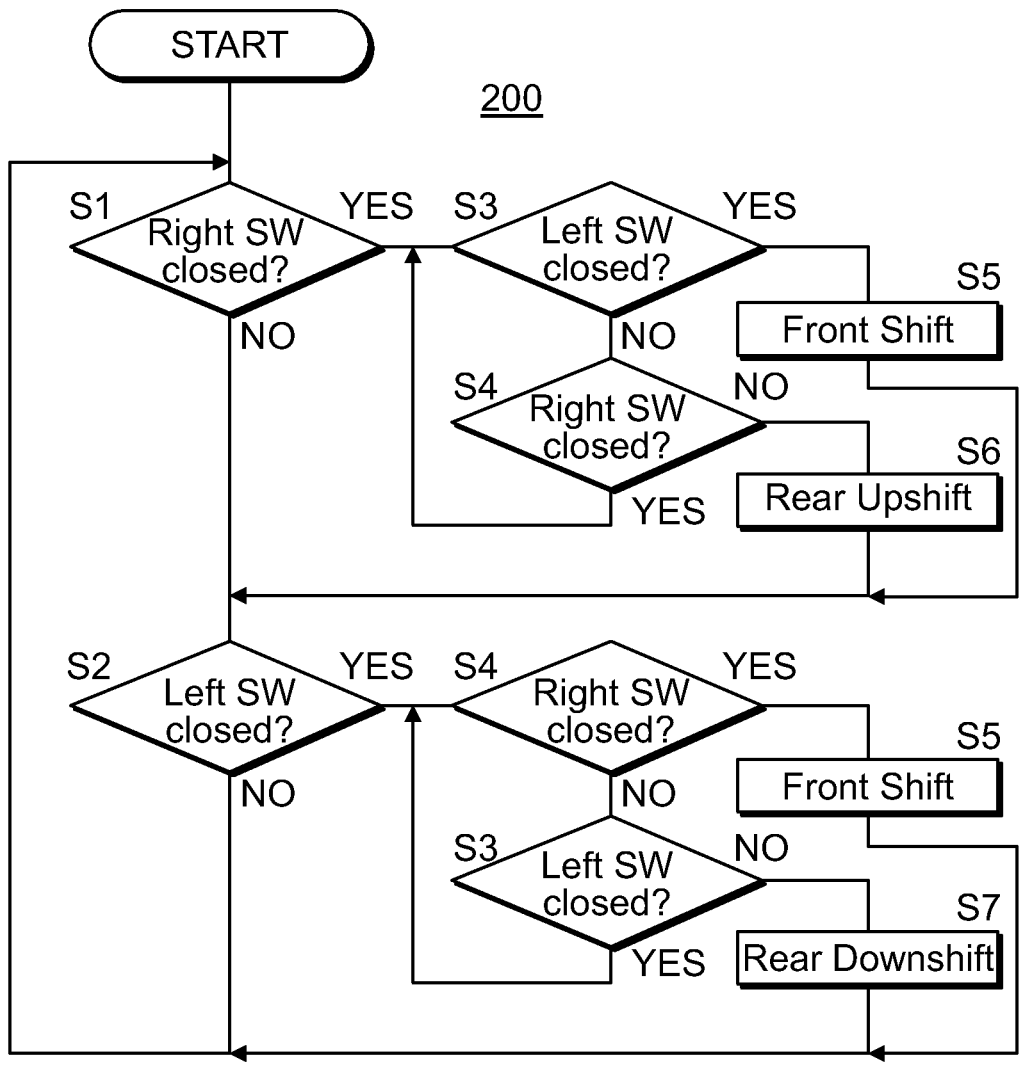
FIG. 9 shows a flow chart illustrating a process control method for the control unit according to an aspect of the invention.

FIG. 9 is a flow chart of a first embodiment of the process control 200 for control unit 28 or 128 of FIG. 6a or 6b, for example. It will be understood that where right and left switches are mentioned in the following, the reference to right and left are for illustrative purposes. Right and left could also be considered as first and second switches, for example, and thus it will be understood that the positional reference is being used for purposes of clarity. In the alternate, the functions and/or positions of the left and right (first and second) switches could be reversed either physically or electronically.

In step S1, the control unit checks to see if the right switch 27a is closed. If it is determined that the switch 27a is closed, at step S3 the control unit 28 or 128 checks if the left switch 27b is closed. If YES, processing is moved to step S5 and the front gear changer 30 is shifted. If, at step S3, the left switch 27b is open, processing moves to step S4 to check if the right switch 27a is still closed. If the right switch 27a is open, processing moves to step S6 and the rear gear changer 36 is up-shifted. Once a right switch closed condition is detected at step S1, the control unit 28 or 128 loops through steps S3-S4 until either the right switch 27a is released or the left switch 27b is pressed. Therefore, a rear gear changer upshift only occurs after pressing and releasing the right switch 27a.

If the result of step S1 is NO, processing moves on to step S2 and the control unit 28 or 128 checks if the left switch 27b is closed. The process is similar to the one described above except that when the left switch 27b is open (released) without pressing the right switch 27a, processing moves to step S7 and the rear gear changer 36 is downshifted.

Figure 10:
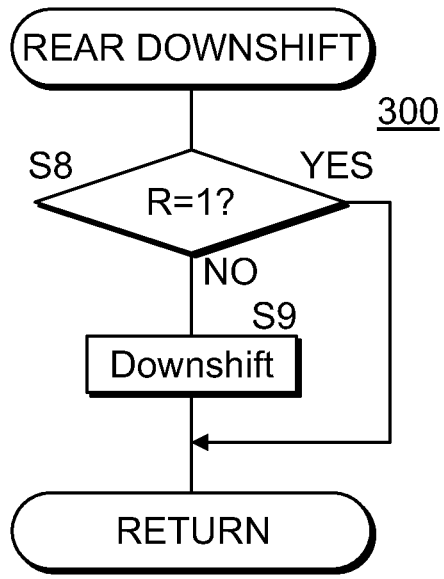
FIG. 10 shows a flow chart illustrating a process control method for the rear downshift method according to an aspect of the invention.

FIG. 10 is a flow chart of a rear downshift routine 300. At step S8 the processor of the control unit 28 or 128 checks to see if the rear gear changer 36 is in position 1 (i.e., aligned with the largest sprocket of the rear sprockets 40, which may also be referred to a first position or first end position). If the result is YES, the routine is exited without executing a downshift, as no further downshifts are possible. If the result of S8 is NO, the process moves to step S9 and the rear gear changer 36 is caused to downshift.

Figure 11:
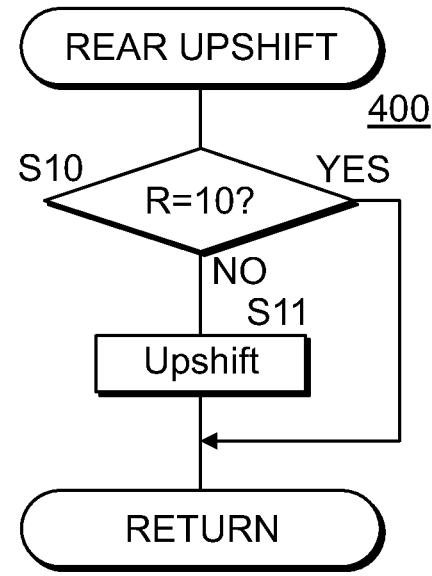
FIG. 11 shows a flow chart illustrating a process control method for the rear upshift method according to an aspect of the invention.

FIG. 11 is a flow chart of a rear upshift routine 400. At step S10 the processor checks to see if the rear gear changer 36 is in position 1 (i.e., aligned with the smallest of the rear sprockets 40 also referred to as a last position or second end position). If the result is YES, the routine is exited without executing an upshift, as no further upshifts are possible. If the result of S10 is NO, the process moves to step S11 and the rear gear changer 36 is caused to upshift.

Figure 12:
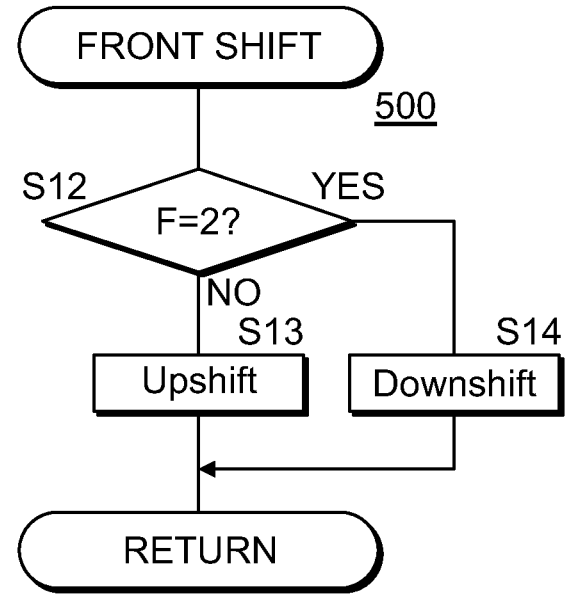
FIG. 12 shows a flow chart illustrating a process control method for the front shift method according to an aspect of the invention.

FIG. 12 is a flow chart of a front shift routine 500. At step S12 the control unit 28 or 128 processor checks to see if the front gear changer 30 is in the position 2 (i.e., aligned with the larger of the two chainrings). If the result is YES, processing moves to step S14 and the front gear changer 30 downshifts. If the result of step S12 is NO, the front gear changer is upshifted. Therefore, every time a front shift command is sent from step S5 the front gear changer will toggle between position F1 and F2, the direction depending on which position it is in initially.

Figure 13:
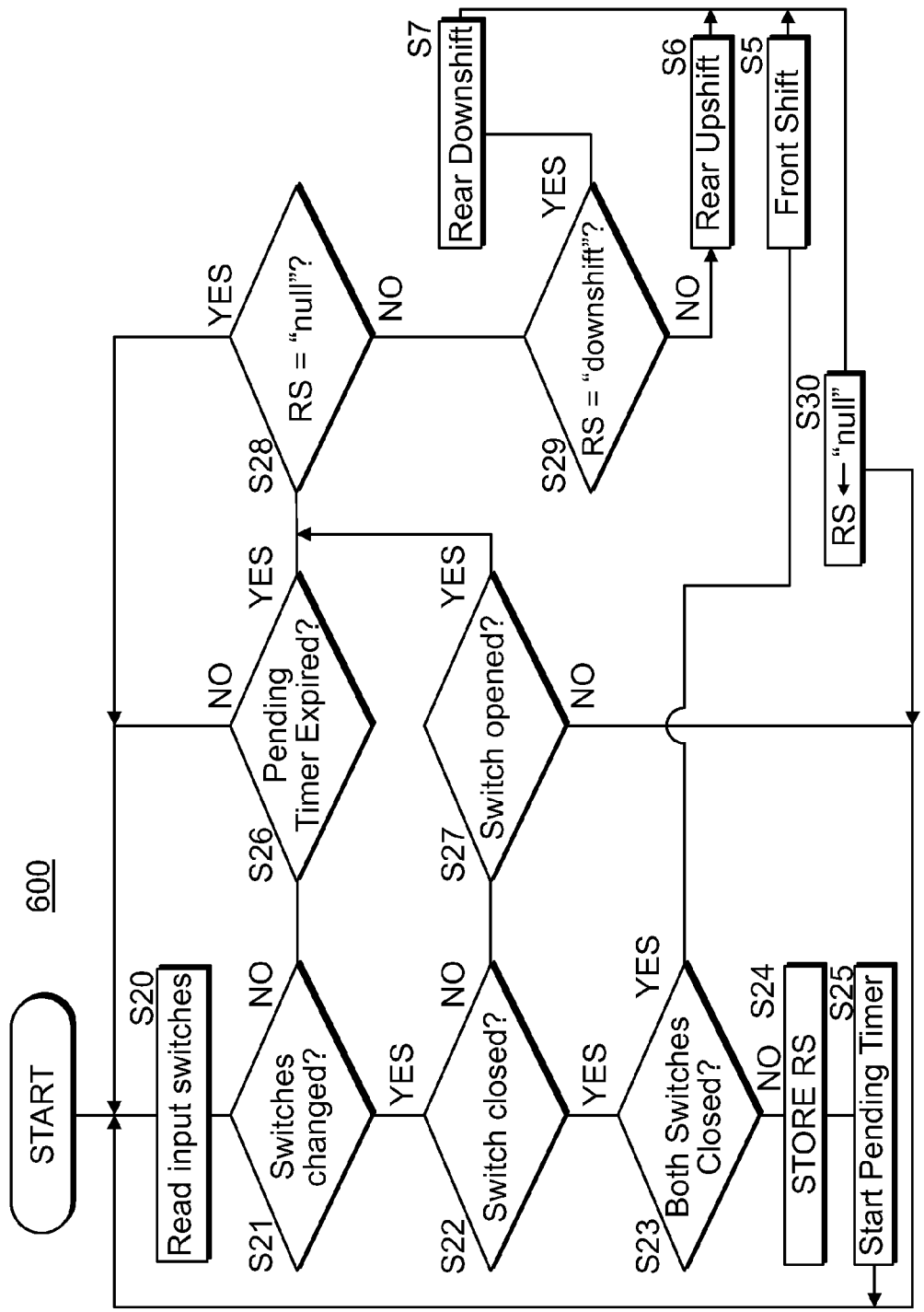
FIG. 13 shows a flow chart illustrating another embodiment of a process control method for the control unit according to the invention employing a timer.

FIG. 13 is a flow chart of a second embodiment 600 of the process control for the control unit 28 or 128. A difference in this embodiment compared with the embodiment shown in FIG. 9 is that when a single switch is operated, a rear upshift or downshift will be executed after an elapsed time, without the need to release the switch.

When a single shift switch (e.g., one of 27a or 27b) is closed and held, the operation is as follows: In step S20, the switches are read and the state of each (open or closed) is stored in memory 141. In step S21, the system 28 or 128 checks if the state of any of the switches has changed since the previous read. In this case since a single switch was pressed (closed) the processor moves to step S22 then on to step S23 because a switch was closed. Since both switches were not closed, processing moves to step S24 the variable RS is assigned a rear shift value (see FIG. 14 below: "STORE RS"). The initial value of the RS variable upon program START is "null".

Figure 14:
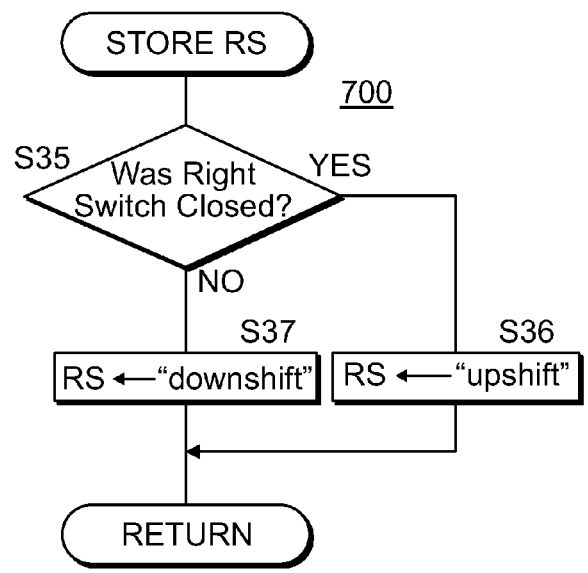
FIG. 14 shows a flow chart illustrating a rear shifter status store routine.

FIG. 14 is a flow chart 700 of the STORE RS routine. RS can be a value corresponding to one of "upshift," "downshift," or "null." In step S35 the processor of control unit 28 checks the memory 141 to see if the right switch 27a was closed during step S20 of the flow chart FIG. 13. If the result is YES, processing moves to step S36 and a value corresponding to "upshift" is assigned to variable RS. If the result of S35 is NO, processing moves to step S37 where a value corresponding to "downshift" is assigned to variable RS. Processing then moves to step S25 of FIG. 13 where a "pending timer" is started. The process moves back to step S20 to read the input switches, then to step S21 where the result will be NO since the inputs have not changed.

Processing continues to loop through steps S26, S20, and S21 until the pending timer expires. Processing then moves to step S28 to check if a rear shift value has been assigned to variable RS. Processing moves to step S29 where the value of RS determines if the rear gear changer will upshift or downshift. If RS="downshift", processing moves to step S7 where a rear downshift is executed, otherwise processing moves to step S6 and a rear upshift is executed. From either of step S6 or step S7 processing moves to step S30 where the value RS is cleared and set to "null" and processing continues back to step S20.

When the switch is opened (released) after the rear gear changer 36 has shifted due to a "pending timer expired" condition the operation will continue as follows: Step S21 detects the switch open change and processing continues to step S22. Step S22 (switch closed?) will be NO and processing continues to step S27 (button released?) where a YES sends processing to step S28 (RS=null?). Since the value of RS was set to "null" immediately after a rear downshift or upshift in step S30, the response will be YES and processing continues back to step S20 and no additional rear shift will occur.

However, if the switch was not opened (released) and a second switch was closed (pressed) after the rear gear changer 36 has shifted due to a "pending timer expired" condition the operation will continue as follows: When the processor executes step S21 (switch changed since last read?) the result will be YES and processing moves to step S22. The result of S22 (switch closed?) will be YES and processing continues to step S23 (both switches closed?) where a YES result sends processing to step S5 (shift front) and a front shift is executed. Therefore, if a first switch is closed and held past the "pending timer" duration then a second switch is closed, the system first shifts the rear gear changer 36, and then shifts the front gear changer 30.

When a single shift switch is closed and opened before the pending timer expires, the operation is as follows: In step S20 the input buttons are read and stored in memory 141. In step S21 the system checks if the switches have changed state since the previous read. In this case, since a switch was pressed, the processor will move to step S22 then on to step S23. Since both switches were not closed processing moves to step S24 where the variable RS is assigned a rear shift value. Processing moves to step S25 where the pending timer is started. The process moves back to step S20 then to step S21 where the result will be NO. Processing continues to loop through steps S26, S20, and S21 until the switch is opened or released. The change will be detected by step S21 where the result will be YES and processing will continue to step S22. The result of step S22 (switch closed?) will be NO, processing moves to step S27. The result of step S27 (switch opened?) will be YES, and processing will move to step S28 (RS=null?) to check if a rear shift value been assigned to variable RS. Processing moves to step S29 where the value of RS determines if the rear gear changer will upshift or downshift. If RS="downshift", processing moves to step S7 where a rear downshift is executed, otherwise processing moves to step S6 and a rear upshift is executed. From either steps S6 or S7 processing moves to step S30 where the value RS cleared and set to "null" and processing continues back to step S20.

If a single switch is closed and a second switch is closed before the "pending timer" expires, the operation will be as follows: In step S21 the system 28 checks if the switches 27a, 27b have changed since the previous read, in this case since a switch was pressed the processor will move to step S22 then on to step S23. Since both switches were not closed just yet, processing moves to step S24 where the variable RS is assigned a rear shift value, depending on which switch was closed. Processing then moves to step S25 where the pending timer is started. The process moves back to step S20 then to step S21 where the result will be NO. Processing continues to loop through steps S26, S20, and S21 until the second switch is closed. At this time the result of step S21 will be YES and processing will move to step S22 where the result will be YES and processing will continue to step S23 (both switches closed?). The result of step S23 will be YES and processing will move to step S5 (shift front) and a front shift will be executed. Processing will continue to step S30 where RS is set to "null" and processing continues back to step S20. When the switches are released processing will continue through steps S21, S22, S27 and S28. In step S28 (RS=null?) the result will be YES and processing will continue back to step S20 and therefore no rear shifting will occur from the switch opening (release).

The shift interpreter 102 may also be programmed to allow multiple rear shifts if a single switch is held for a long duration. The present invention could also be adapted to shift three chainrings as follows: When a FRONT SHIFT routine is executed if the front gear changer is in the large chainring position, then downshift. If the front gear changer is in the small chainring position, then upshift. If the current chainring is the middle chainring the shift interpreter 104 can use a measured parameter to determine whether an upshift or downshift is required, such as speed, acceleration, rear gear changer gear position, torque measured from a power meter, inclination of the road, among others. Another method to determine whether an upshift or downshift is requested when shifting from the middle chainring would be to use the RS variable that is set to the direction (upshift or downshift) of the switch that was pressed first. For example, when an upshift is desired from the middle chainring, the rider closes the right switch before the left switch, indicating the desire to upshift.

Figure 15:
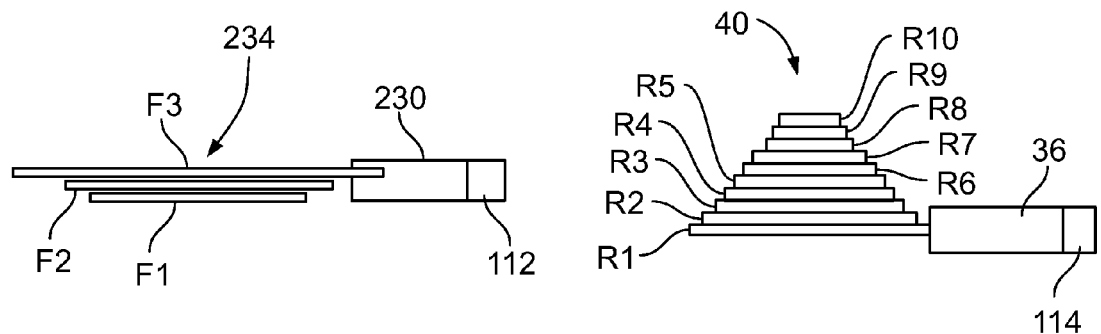
FIG. 15 shows another diagram of front and rear gear changers and front and rear sprockets, wherein the front sprockets comprise 3 chainrings.

Turning to FIG. 15 (and also referring to FIG. 1) the front sprocket assembly 234 may include three coaxially mounted sprockets F1-F2-F3, and rear sprocket assembly 40 may include ten sprockets R1-R10. The number of teeth on front sprocket F1 is preferably less than the number of teeth on sprocket F2, and the number of teeth of F3 is preferably greater than the number of teeth on sprocket F2. The numbers of teeth on rear sprockets R1-R10 typically gradually decrease from rear sprocket R1 to sprocket R10. Front gear changer 230 moves from a first operating position to a second operating position to move the chain 72 (FIG. 1) between sprockets F1 and F2 and from the second operating position to a third operating position to change to sprocket F3. The rear gear changer 36 moves between ten operating positions, for example, to switch the chain to one of rear sprockets R1-R10. Preferably, a front gear position sensor 112 is used to sense the operating position of the front gear changer 230, and a rear gear position sensor 114 is used to sense the operating position of the rear gear changer 36. Gear position sensors 112, 114 may comprise rotary encoders, potentiometers, or other devices capable of sensing position in a gear changer mechanism. Preferably, a battery 84 (FIG. 1), or more than one battery, or some other power source powers the front and rear gear changers 230, 36 as well as other electric components within the system.

Figure 16:
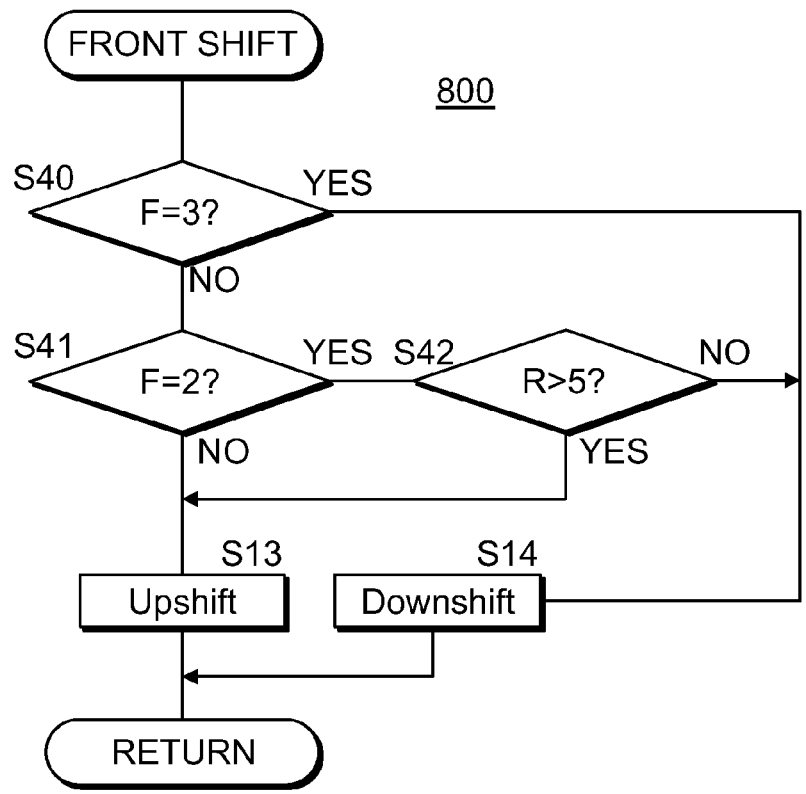
FIG. 16 shows a flow chart illustrating an embodiment of a front gear change method.

FIG. 16 shows a flow chart of another front shift routine 800. At step S40 the control unit 28 or 128 processor checks to see if the front gear changer 230 is in position 3 (i.e., aligned with the largest of the three chainrings). If the result is YES, processing moves to step S14 and the front gear changer 230 downshifts to F2. If the result of step S40 is NO, the control unit 28 or 128 checks to see of the front gear is in the position 2 (i.e., aligned with the middle of the three chainrings). If the result is NO, processing moves to S13 and an upshift is performed. If the result at S41 is YES, processing then checks to see if the rear gear changer is aligned with a rear sprocket greater than R5. If the result is NO, then a downshift is performed at S14. Conversely, if the result is YES, then an upshift is performed at S13.

The front shift method illustrated in FIG. 16 uses rear gear shift position criteria to determine how to shift the front gear change mechanism. This is an example of one criterion. Other criterion may include: crank speed (pedaling cadence), bicycle wheel speed; increasing bicycle speed (acceleration) or decreasing bicycle speed (deceleration); pedaling torque; and bicycle inclination (uphill vs. downhill) for example. Any of the above criteria may be determined and implemented in the invention with well known sensors and processing devices.

Figure 17:
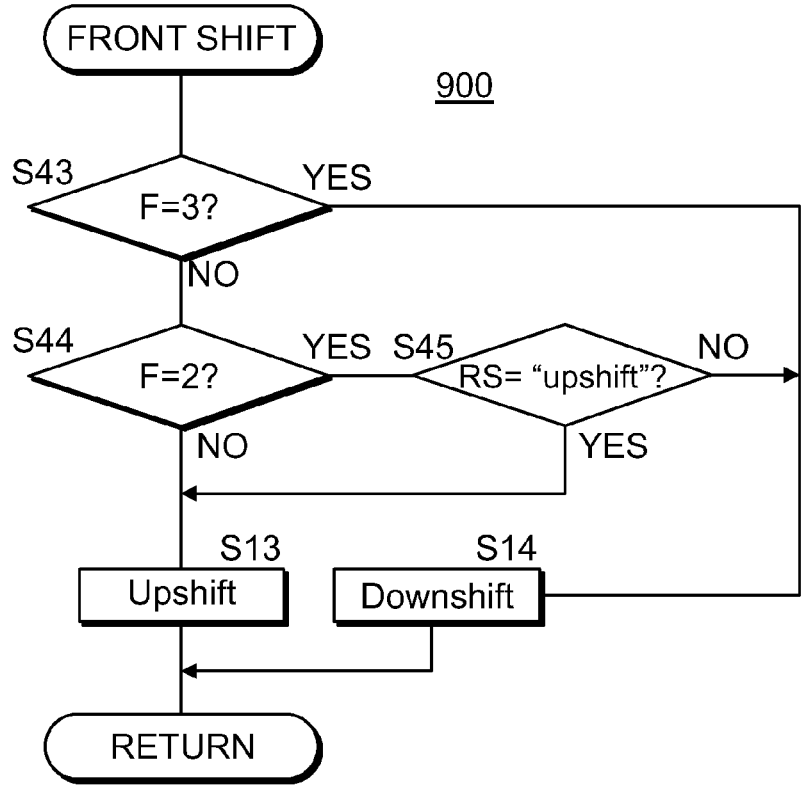
FIG. 17 shows yet another flow chart illustrating an embodiment of a front gear change method.

FIG. 17 shows at 900 another front shift routine. At step S43 the control unit 28 or 128 processor checks to see if the front gear changer 230 is in position 3 (i.e., aligned with the largest of the three chainrings). If the result is YES, processing moves to step S14 and the front gear changer 230 performs a downshift to F2. If the result of step S43 is NO, the control unit 28 or 128 checks to see of the front gear is in the position 2 (i.e., aligned with the middle of the three chainrings). If the result is NO, processing moves to S13 and an upshift is performed. If the result at S44 is YES, processing then checks at S45 to see if RS equals "upshift," (see FIG. 14). If RS does not equal "upshift" then processing moves to step S14 and the front gear changer 230 performs a downshift (to F1). If RS equals "upshift" then processing moves to S13 and an upshift is performed.

While this invention has been described by reference to a particular embodiment, it should be understood that numerous changes could be made within the spirit and scope of the inventive concepts described. Accordingly, it is intended that the invention not be limited to the disclosed embodiment, but that it have the full scope permitted by the language of the following claims. Also, where the claims do not expressly state or necessarily imply the sequence of all or some steps, it would cover the steps performed in any order or simultaneously.

The invention claimed is:

1. An electronic shifting system for a bicycle, comprising:
   a first switch mechanism;
   a second switch mechanism;
   a control unit in communication with and responsive to signals from the first and second switch mechanisms; and
   a front gear shift mechanism in communication with and responsive to command signals from the control unit, wherein the control unit is configured to determine when both the first switch mechanism and the second switch mechanism are actuated concurrently and responsively sends only a front shift command signal to the front gear shift mechanism to perform a front gear shift operation.

2. The electronic shifting system of claim 1, further comprising a rear gear shift mechanism in communication with and responsive to signals from the control unit;
   wherein the control unit is configured to determine if both of the first and second switch mechanisms are not actuated concurrently, and responsively sends a rear shift command signal to the rear gear shift mechanism to perform a rear gear shift operation dependent upon which of the first and second switch mechanisms are actuated.

3. The electronic shifting system of claim 2, wherein the rear gear shift operation is performed after expiration of a predetermined time period.

4. The electronic shifting system of claim 2, wherein the rear gear shift operation is performed if one of the first and second switch mechanisms is actuated and then non-actuated before the expiration of a predetermined time period.

5. The electronic shifting system of claim 1, further comprising a front gear position sensor for sensing a current gear position of the front gear shift mechanism, wherein the control unit is configured to send the front shift command signal to move the front gear shift mechanism a direction to perform a front gear shift operation depending on the sensed current gear position.

6. The electronic shifting system of claim 1, wherein the front gear shift mechanism includes two gear positions.

7. The electronic shifting system of claim 1, wherein the front gear shift mechanism includes three gear positions.

8. A method of shifting a bicycle with an electronic gear shifting system, wherein the electronic gear shifting system comprises a first switch mechanism, a second switch mechanism, a control unit in communication with and responsive to signals from the first and second switch mechanisms, and a front gear shift mechanism in communication with and responsive to command signals from the control unit, comprising the steps of:
   determining with the control unit that both of the first and second switch mechanisms are actuated concurrently, and
   performing only a front gear shift operation with the front gear shift mechanism.

9. The method of shifting a bicycle with an electronic gear shifting system of claim 8, wherein the front gear shift mechanism performs the front gear shift operation between two gear positions.

10. The method of shifting a bicycle with an electronic gear shifting system of claim 8, wherein the front gear shift mechanism performs the front gear shift operation between three gear positions.

11. A method of shifting a bicycle with an electronic gear shifting system, wherein the electronic gear shifting system includes a first switch mechanism, a second switch mechanism, a control unit in operative communication with and responsive to signals from the first and second switch mechanisms, and a front gear shift mechanism in operative communication with and responsive to command signals from the control unit, comprising:
   monitoring with the control unit if one of the first and second switch mechanisms is actuated;
   sensing when one of the first and second switch mechanisms is actuated;
   determining if the other of the first and second switch mechanisms is actuated if the one of the first and second switch mechanisms is actuated;
   generating only a front shift command signal with the control unit if the first and second switches are determined to be actuated concurrently; and
   performing a front gear shift operation with the front gear shift mechanism responsive to the front shift command signal.

* * * * *